No. 879,820. PATENTED FEB. 18, 1908.
E. GIULIETTI.
SCENE SHIFTING DEVICE.
APPLICATION FILED AUG. 12, 1907.

6 SHEETS—SHEET 1.

No. 879,820. PATENTED FEB. 18, 1908.
E. GIULIETTI.
SCENE SHIFTING DEVICE.
APPLICATION FILED AUG. 12, 1907.

6 SHEETS—SHEET 4.

Witnesses
H. L. Dixon.
C. E. Pover.

Inventor
Enrico Giulietti
by his Atty
W. P. Thompson

No. 879,820. PATENTED FEB. 18, 1908.
E. GIULIETTI.
SCENE SHIFTING DEVICE.
APPLICATION FILED AUG. 12, 1907.

6 SHEETS—SHEET 5.

Witnesses
H. L. Dixon.
C. E. Pover.

Inventor
Enrico Giulietti
by his Atty
W T Thompson

No. 879,820.

PATENTED FEB. 18, 1908.

E. GIULIETTI.
SCENE SHIFTING DEVICE.
APPLICATION FILED AUG. 12, 1907.

6 SHEETS—SHEET 6.

Witnesses
H. L. Dixon
C. E. Power

Inventor
Enrico Giulietti
by his Att'y
W. P. Thompson

UNITED STATES PATENT OFFICE.

ENRICO GIULIETTI, OF GENOA, ITALY.

SCENE-SHIFTING DEVICE.

No. 879,820.  Specification of Letters Patent.  Patented Feb. 18, 1908.

Original application filed March 14, 1905. Serial No. 250,088. Divided and this application filed August 12, 1907. Serial No. 388,103.

*To all whom it may concern:*

Be it known that I, ENRICO GIULIETTI, subject of the King of Italy, residing in Genoa, in the Kingdom of Italy, engineer, have invented certain new and useful Improvements in Scene-Shifting Devices.

The object of this invention is a special arrangement of the side scenes in theaters, by which it is possible to change the side scenes with great rapidity and facility.

The invention is shown in connection with a device for changing the stages of theaters set forth in my contemporaneous application No. 250,088.

Figure 1:
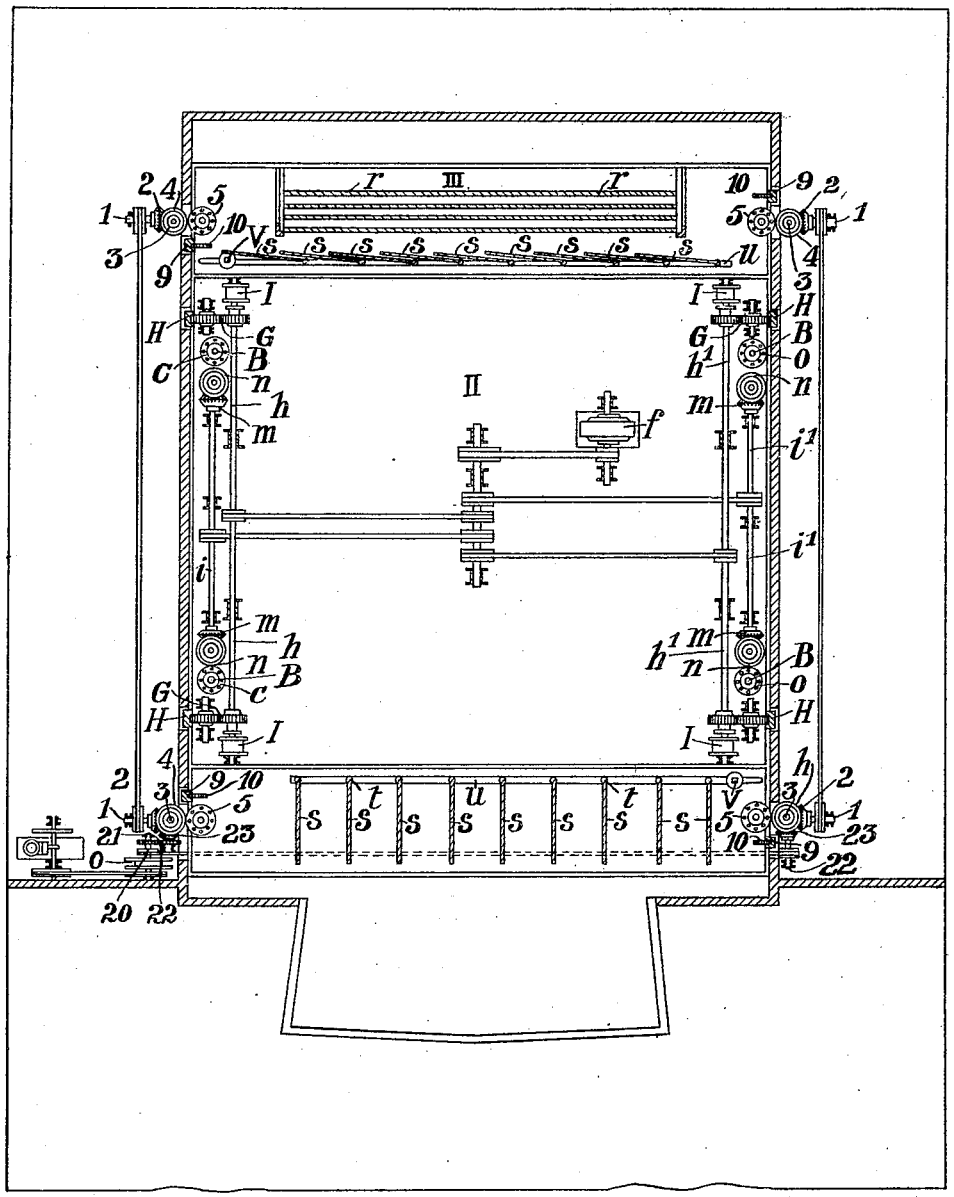
Figure 2:
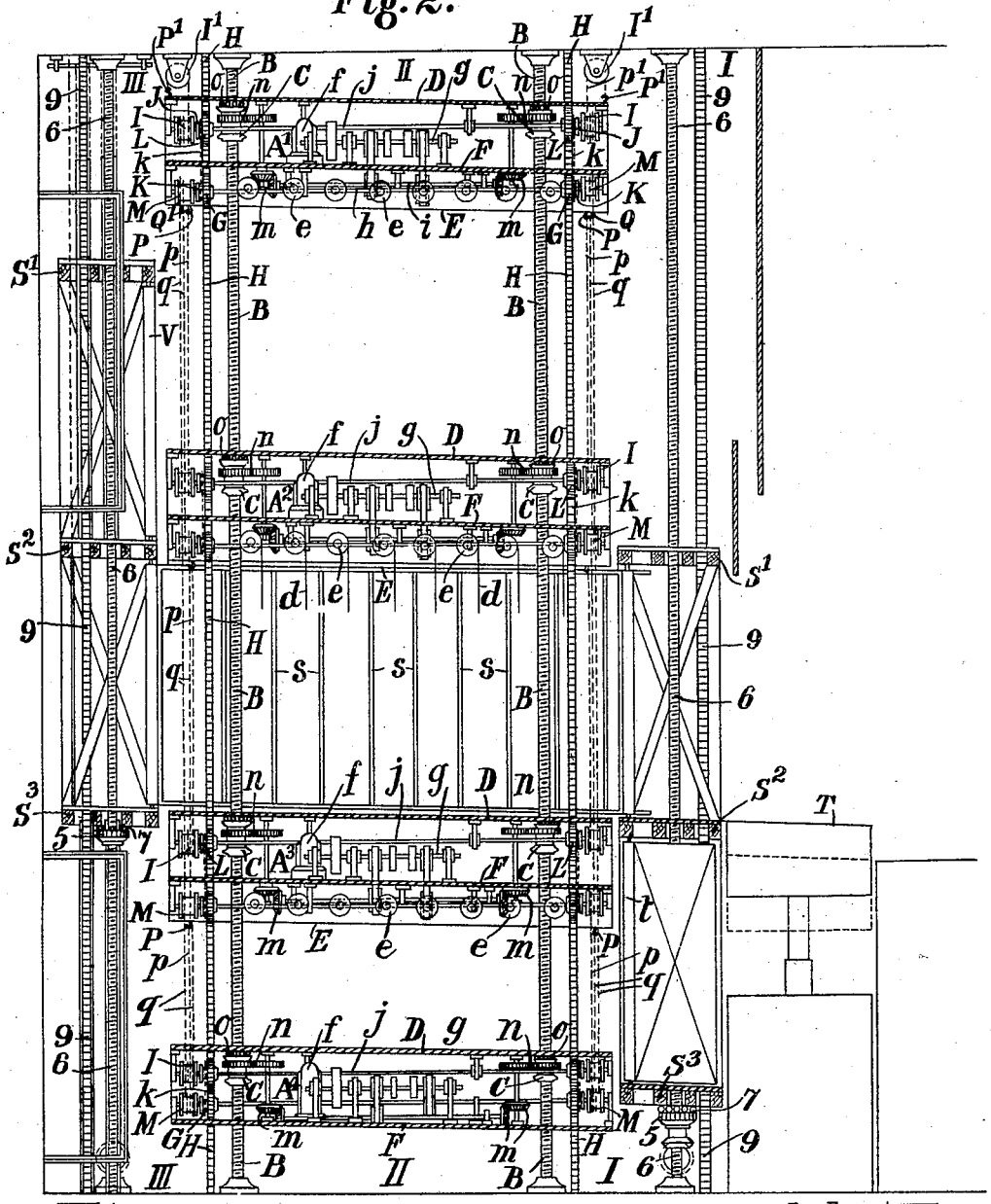
Figure 3:
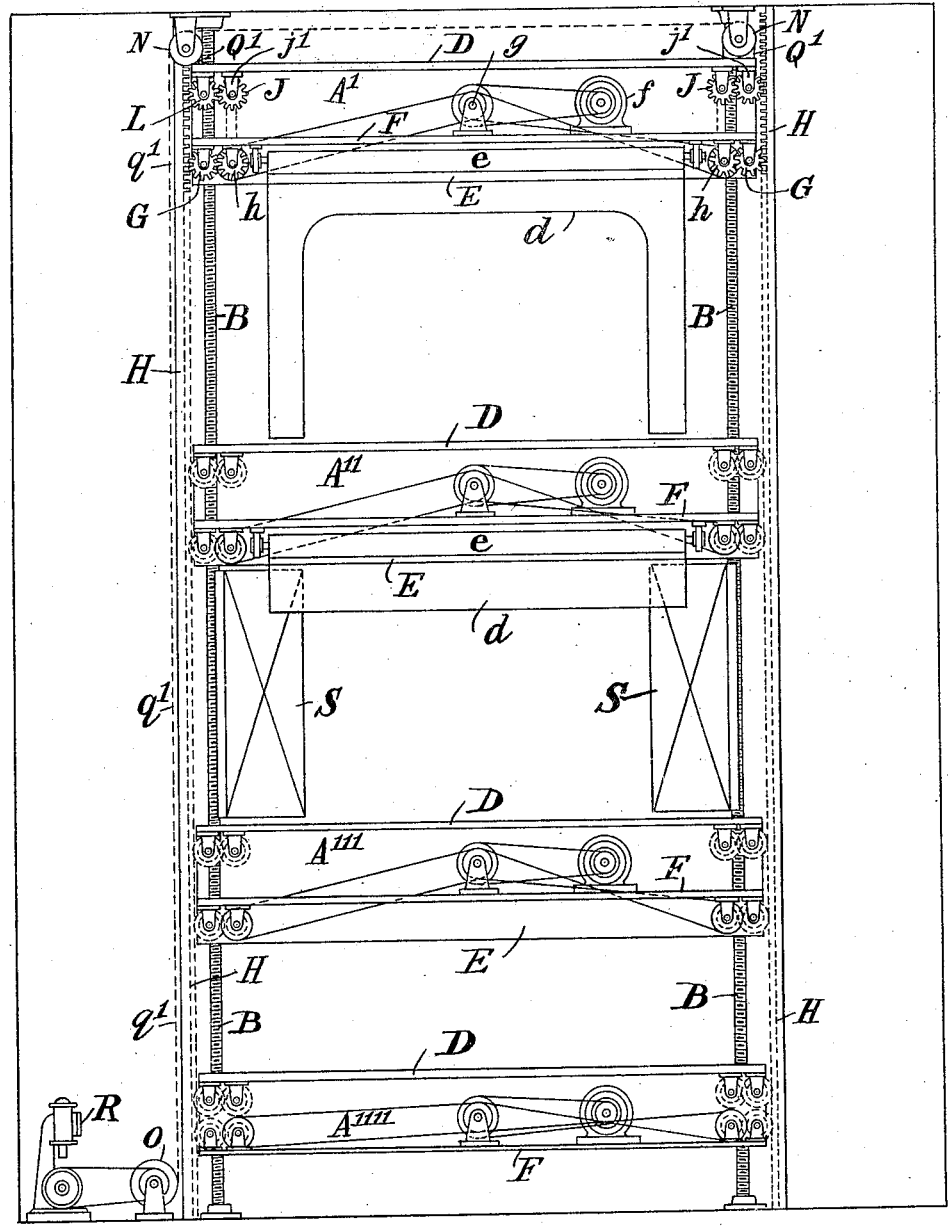
Figure 4:
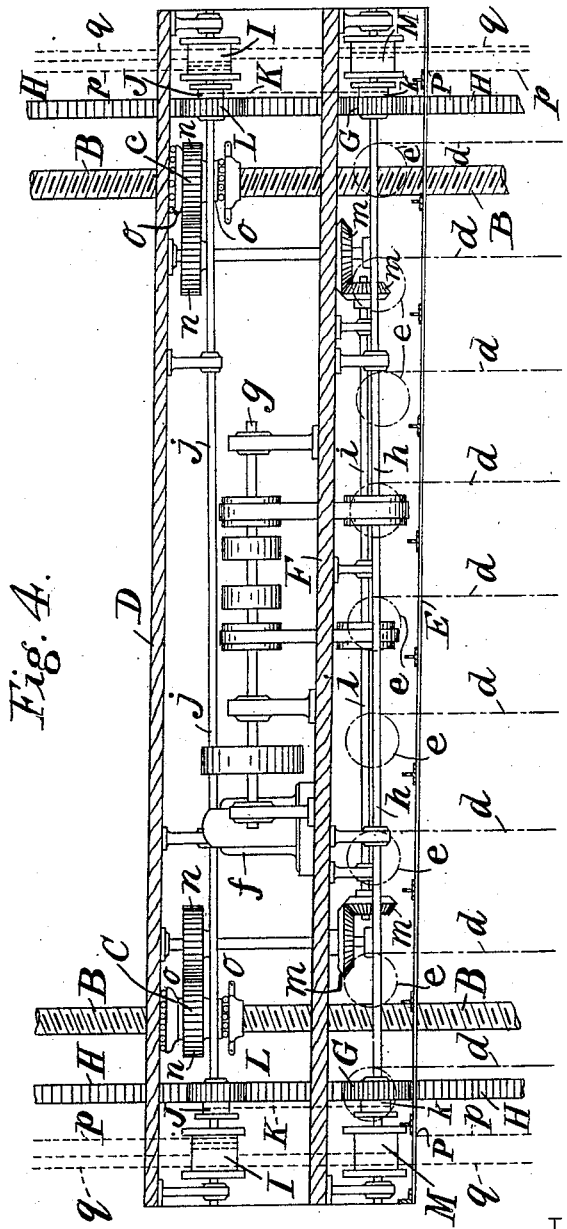
Figure 5:
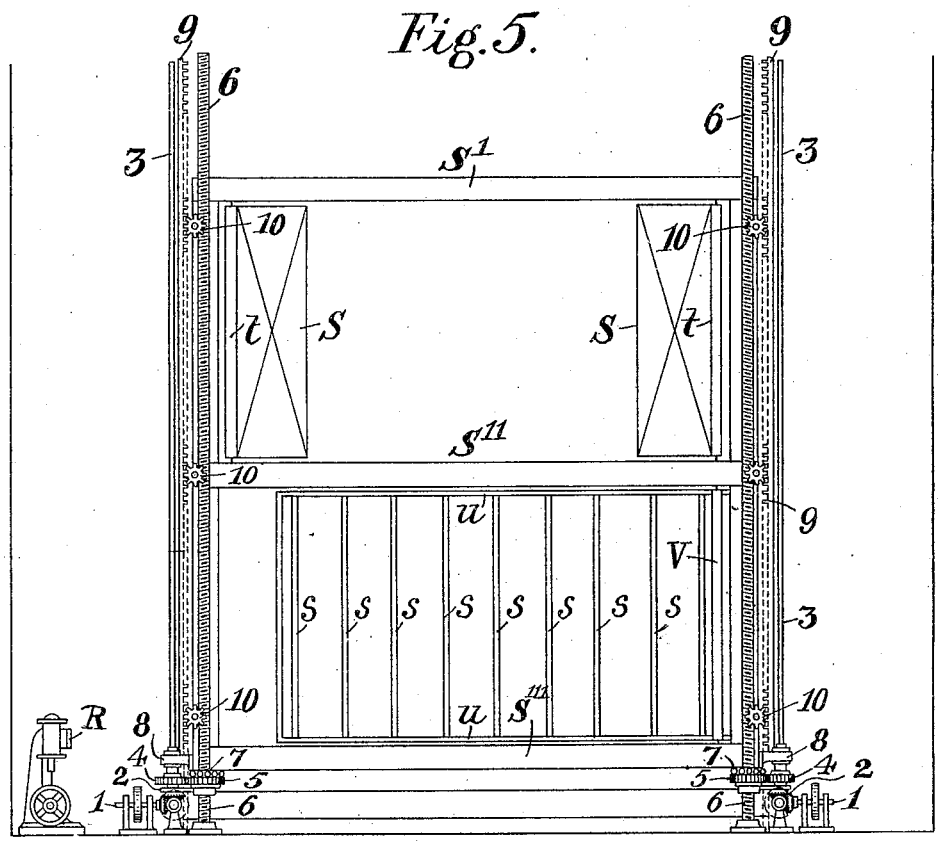
Figure 6:
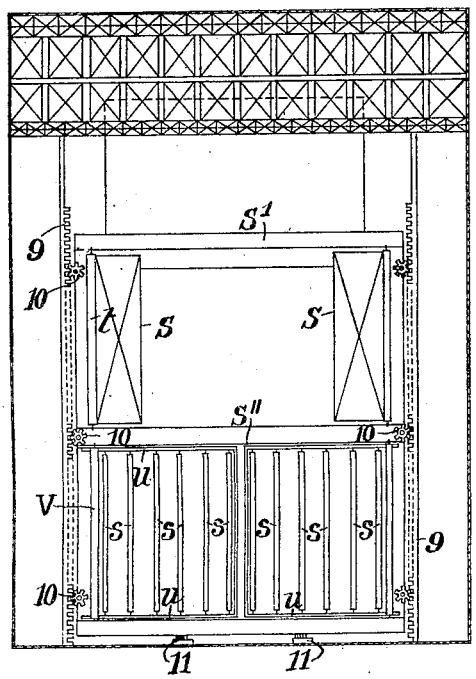
Figure 7:
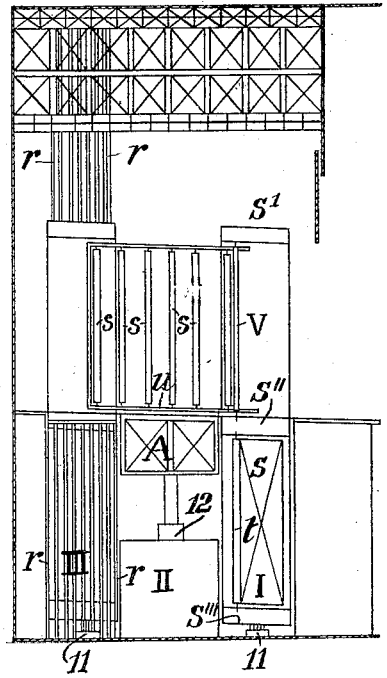
Figure 8:
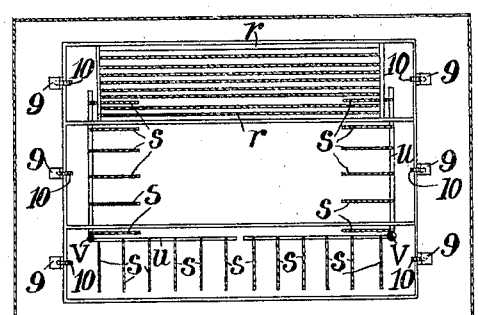

In the accompanying drawings:—Figure 1 is a plan of the space occupied by the stage and by the mechanism connected therewith; Figs. 2 and 3 are sectional elevations the former at right angles and the latter parallel to the front of the stage; Fig. 4 is a sectional elevation on a larger scale of one of the stages showing the mechanism for raising and lowering; Fig. 5 is a sectional elevation of part of the first compartment taken on a line parallel to the front of the stage; Fig. 6 is the plan; and Figs. 7 and 8 are sectional elevations, the former parallel and the latter at right angles to the front of the stage, of the stage space of a smaller theater in which as the changing of floors is impossible the invention is shown applied to the changing of side scenes only.

In carrying out the invention the space occupied by the stage is divided into three compartments I, II, and III one behind the other (Figs. 1 and 2). Compartments I and III are intended for replacing side scenes; compartment III also for replacing the back curtains; compartment II is intended for the change of stage (scaffolds, boards).

We will begin the description of the working of stages (scaffolds, boards).

Compartment II contains several stages A′, A″, A‴ and A⁗ (for instance four as shown in Figs. 1, 2, 3, 4 and 5) superposed the one over the other. Reference is now made to Fig. 4 which represents any one of these stages. This has its surface upon which the actors play covered with boards D. In the under parts E are transverse slots through which the curtains $d$ pass, intended for the decoration of the ceiling, or used as intermediate curtains. These curtains are rolled up on drums $e$, similar to those generally used in theaters for the same purpose. F is an intermediate floor of the stage used by the scene shifters. The distance between the two floors D and F is such as to allow the scene shifter to stand and move about. On the same floor is placed an electric motor $f$, which, by means of a belt, actuates the shaft $g$ which transmits the movement to the two sets of shafts $h$, $i$ and $h'$, $i'$ placed along the right side and the left side of the scaffold. We will now describe the working of these shafts $h$, $i$ and $h'$, $i'$.

One shaft $i$, $i'$, of each set, through suitable gearing $m$, $m$, and $n$, $n$, turns the four nuts C along the thread of the screw, which runs the whole length of four columns B situated at the four corners and extending to the full height of compartment II. Consequently, when the four nuts C turn, they go up or down along the columns B, carrying up or down, with them, the stage with which they are connected by means of ball bearings $o$. The other shaft $h$, $h'$, of each set turns four toothed wheels G which work into four racks H, the height of which is equal to that of compartment II. Consequently, on being turned, the four wheels G move along the racks H carrying up or down with them the stage to which their shafts are secured. Thus the stage can rise or sink by means of the nuts C running along the four columns B, as well as by means of the toothed wheels G gearing into the four racks H. It is by these two ways that the rising and sinking of the stage is made easy and sure. It is however made still more easy and sure by means of a third contrivance, viz: by two systems of wire ropes $p$ and $q$, and which work as follows:—One system of wire ropes is intended to connect each stage with that which is immediately below, to which the upper one thus affords a suspension point. For this purpose each wire rope $p$ is fixed, by one of its ends to a point P on the stage, while the other end is wound round a drum I which is fixed on the stage placed immediately below the former one. These drums I are mounted on a shaft $j$ rotated by the wheel K on the shaft $h$ through the chain $k$ rotating the drum J on the shaft $j$. Toothed wheels L mounted on the small counter shaft $j'$ and gearing into the vertical rack H, are intended to act as a further guide, while they also aid the rising of the stage. When for instance the stage A‴ is rising, its four drums I turn and wind up the four ropes $p$ which then support the stage A‴ when rising, some of its weight being carried by the stage A″ which is immediately above. But as the stage A″ is also supported through a similar arrangement of ropes, by the stage A′ next above, it follows that the weight of the stage A‴ is carried forward to the top stage A′. This stage A′ is supported as follows:—On its own drum I is fastened and wound, as on the other drums of the other stages, a rope $p$ which passes above, round a pulley I′ and is afterwards fixed at its end to a point P′ on the same stage. Thus the suspension of the stage A′ is effected by means of the pulley I′ fixed into the ceiling of compartment II.

The other system also consists of four wire ropes $q$ each fastened by one end to a point Q on each of the four corners of the highest stage A′. Each rope is passed several times round a drum M, on the stage A″ immediately below, and afterwards on other drums M on the two lower stages A‴ and A⁗. Then passing upwards it is wound round and fastened by the opposite end on the drum M of the top stage A′. All these drums M are upon the shafts $h$ of the separate stages, being fast or loose at will, by means of suitable couplings. The drums M of the top stage A′ however, are always fixed on their shaft. Supposing now that any one of the stages for instance A‴ is to be raised, while the other ones are to remain motionless, it will be enough to loose the drums of the stages that are to remain motionless, with the exception of those of the top stage A′. The shaft $h$ of the stage A‴ which is to be raised is put in motion by the electric motor $f$ on its own stage, and will drive the drum M fixed on it, and this drum will wind up the rope $q$ on one side, while it will unwind it on the other side. Vice versa, when the stage is to be lowered. The operation of the ropes $q$ is thus a double one. Firstly they act as a stop brake of the stages; secondly, they offer another way of suspending any one of the stages to the top stage A′ during movement, viz: to help it when going up and brake it when going down.

In order to give to the top stage A′ itself, a second means of suspension (beyond that offered by the first system of ropes and the rope pulley already described) it is provided with four more wire ropes $q'$ (Fig. 3) fastened by one end to points Q′ on the top stage A′ and passing afterwards round pulleys N fixed to the ceiling at opposite sides of compartment II and finally around the winding drum O of a motor R situated on the floor of the compartment. It follows that the weight of the top stage A′ and consequently, also that of the stages which are below it, is particularly supported by the double system of ropes $p'$ and $q'$ described, which by means of the contrivances already explained, help the ascent and brake the descent of the top stage A′. In short: the raising and lowering of the stages is performed by the simultaneous and connected working—1st.—of the nuts C driven along the screw threaded columns B; 2nd.—of the toothed-wheels G gearing with the vertical racks H; 3rd.—of the two systems of wire ropes $p$ and $q$ wound around their respective drums I and M.

*Manipulation of backs.*—The change of the back scenery is accomplished in compartment III in the usual way, viz: by means of ropes, pulleys, counter weights and the like, arranged so as to allow the scene shifters to replace any scenery used very easily. All this is well known in all theaters.

*Manipulation of side scenes.*—This is accomplished in compartments I and III. In each of these compartments there are several scaffolds (for instance three as shown in the drawings S′, S″ and S‴) which may rise or sink simultaneously. We will begin by the description of these movements, viz: rising and sinking, special reference being made to Figs. 1 and 5. These movements are accomplished by the agency of the motor R situated on the floor of the compartment. This motor actuates the shafts 1, 1, by means of intermediate shaft 20 which by gearing 21 revolves shaft 22 which in its turn actuates bevel gearing 23 connected to the shafts 1 in question, these through bevel gearing 2, 2, rotate the four columns 3 situated near the four corners of the stage. Each of these columns has a groove running throughout its length. In this groove slides a tenon carried by a toothed wheel 4 gearing with another toothed wheel 5. This latter has an internal thread working on a screw threaded vertical column 6. Of these latter columns there are four situated adjacent to the four grooved columns. The wheel 5 with the internal thread thus works exactly as the nuts C which move along the columns B to raise and lower the stages as before described. This wheel 5 when turning goes up and down along the screw threaded column 6, carrying up and down it the scaffold S‴ which it supports by means of ball bearings 7. But as the scaffolds S′, S″ and S‴ are rigidly connected to each other, it follows that they move up and down together. As the support 8 of the wheel 4 is connected with the lowest scaffold S‴, this support 8 moves with the scaffold drawing the wheel 4, the tenon sliding along the grooved column 3. In this way the correct gearing between the wheels 4 and 5 is always secured. Finally: in order to better effect the movement of the scaffolds, there is a rack 9 with which gear, throughout its length, toothed wheels 10, the shafts of which are carried by the scaffolds. When the motor R rotates the internally threaded wheel 5 the scaffolds go up or down according to the direction of rotation.

The change of side scenes is brought about as follows:—The distance between one of the scaffolds and the following one is invariably equal to the height of the fore scene. In this space there are iron frames $u$ carrying the spindles $t$ (turning on their vertical axes) to which the side scenes are attached by means of mortises and tenons. These frames $u$ can turn on their spindles $v$, situated at one end of the frame, as a door on its hinges. We preferably arrange two superposed frames in the compartment III as well as in compartment I. The frames $u$ in compartment I turning on their spindles $v$ carry the side scenes for the decoration of the right side of the scene, while the frames of compartment III carry the side scenes for the decoration of the left side.

When desirous of replacing the side scenes, we begin by withdrawing them from the scene, turning by hand the frames $u$ on their spindles $v$ both the right and the left side. This done, by raising or lowering the whole of the scaffolds, we get two fresh frames, carrying fresh side scenes, on a level with the stage, and by turning the same frames on their spindles $v$, we carry them to the places previously occupied by the other frames for the decoration of the right side and of the left side of the new scene.

In order to achieve speedily and without obstacles all these movements, viz: that of rotation; that of raising or lowering of the frames $u$, it is necessary to begin by turning the side scenes $s$ each on its spindle $t$, until each side scene, instead of being in its normal position, be laid flat on the following one, as shown in Fig. 1 in compartment III. The rotary movement is produced by hand simultaneously for all side scenes by means of a suitable rod connecting them all together.

Having described the manipulation of scaffolds, back and side scenes, we shall now describe how these various operations may be achieved simultaneously. Supposing in compartment II the stage $A'''$ on a level with the fore-scene, is that where the actors are playing. The stage $A''$ over the above mentioned one, provides the curtains $d$ for the decoration of the ceiling. In compartments I and III the respective frames $u$, between the scaffolds $S''$ and $S'''$ with their side scenes decorate the right and left sides of the scene respectively. When wishing to change the scenery, the scene-shifters must begin by taking away from the stage $A'''$, the side scenes turning the frames $u$ of the right side, and of the left side, and carrying them into compartments I and III respectively.

Then:

In compartment II: the stage $A'''$ sinks and is replaced by the stage $A''$ which reaches the level of the fore-scene, while the ceiling curtains $d$ used during the preceding scene are rolled up on their drums $e$. But, meantime, the stage $A'$ has sunk and is come over the next stage $A''$, providing as above described the curtains $d$ for the decoration of the new ceiling.

In compartment I: all the scaffolds rise so far as to bring the lower scaffold $S'$ on a level with the front stage.

In compartment III: all the scaffolds sink so far as to bring the upper scaffold $S''$ on a level with the stage.

In the meantime the back scenery $r$ will have been withdrawn and it will have been replaced.

When those movements of raising and lowering are carried out it remains only to decorate the right side and the left side of the new scene with the side scenes. This will be obtained by turning on their spindles the new frames $u$ which are in compartments I and III on a level with the scene.

In the description of the above contrivances, no mention has been made as to details connected with the reversing of the shafts, the pawls, and the electric connections for bringing the current to the motors of the scaffolds to be moved. All these are but construction details which do not alter the nature and substance of the invention.

If desired in smaller theaters the above arrangement need only be carried out as regards the side scenes the stage not being moved (see Figs. 6, 7 and 8). In this case the stage being of little depth and consequently the number of side scenes being small the side scene-frame for the right side, as well as that for the left side, can be both placed in compartment I. However the change of side scenes is accomplished as seen here above; viz: by lifting and lowering the scaffolds. When a motor fails, the necessary power may be got by an hydraulic piston 11 as those generally employed for lifts. A second hydraulic piston 12 may be placed under the stage A, which consequently might be lowered on a level with the pit on special occasions, as balls, and the like. In such a theater the hindermost compartment is intended for the working of the back scenery alone.

I declare that what I claim is:—

1. In theater staging, a plurality of scaffolds, means for vertically adjusting said scaffolds, frames pivotally supported in said scaffolds, and side scenes supported in said frames.

2. In theater staging, a stage, a plurality of vertically adjustable scaffolds in front of said stage, a plurality of vertically adjustable scaffolds behind said stage, and sets of side scenes for both the right and left hand sides of the stage carried by said scaffolds.

3. In theater staging, a stage, a plurality of scaffolds, columns situated at the four corners of the stage and each provided with a groove, a toothed wheel with a tenon on each of said columns, a toothed wheel with an internal thread gearing with said first wheel, a vertical column at each corner of said stage carrying each of said internally threaded toothed wheels, and means for actuating said grooved columns simultaneously, said internally threaded toothed wheels being connected to said scaffolds.

4. In theater staging, a plurality of vertically adjustable scaffolds in front of said stage, a plurality of vertically adjustable scaffolds behind said stage, frames pivotally mounted in each of said scaffolds, side scenes mounted in each of said frames, and means for raising and lowering said scaffolds.

5. In theater staging, a stage, a plurality of vertically adjustable scaffolds in front of said stage, a plurality of vertically adjustable scaffolds behind said stage, a frame mounted in each of said scaffolds, side scenes mounted in each of said frames, and means for permitting each of said frames to be swung at right angles to its respective scaffold.

6. In theater stages, a stage, a plurality of vertically adjustable scaffolds in front of said stage, a plurality of vertically adjustable scaffolds behind said stage, a motor, connections between said motor and said scaffolds for conveying the motion of said motor thereto, frames pivotally mounted about a vertical axis in each of said scaffolds, and side scenes mounted in each of said frames.

In witness whereof, I have hereunto signed my name this 29th day of July 1907, in the presence of two subscribing witnesses.

ENRICO GIULIETTI.

Witnesses:
AUGUSTO ZANINI,
GUISEPPE PIAGGIO.